(No Model.) 3 Sheets—Sheet 2.
G. C. SHERMAN.
POTATO PLANTER.
No. 552,929. Patented Jan. 14, 1896.
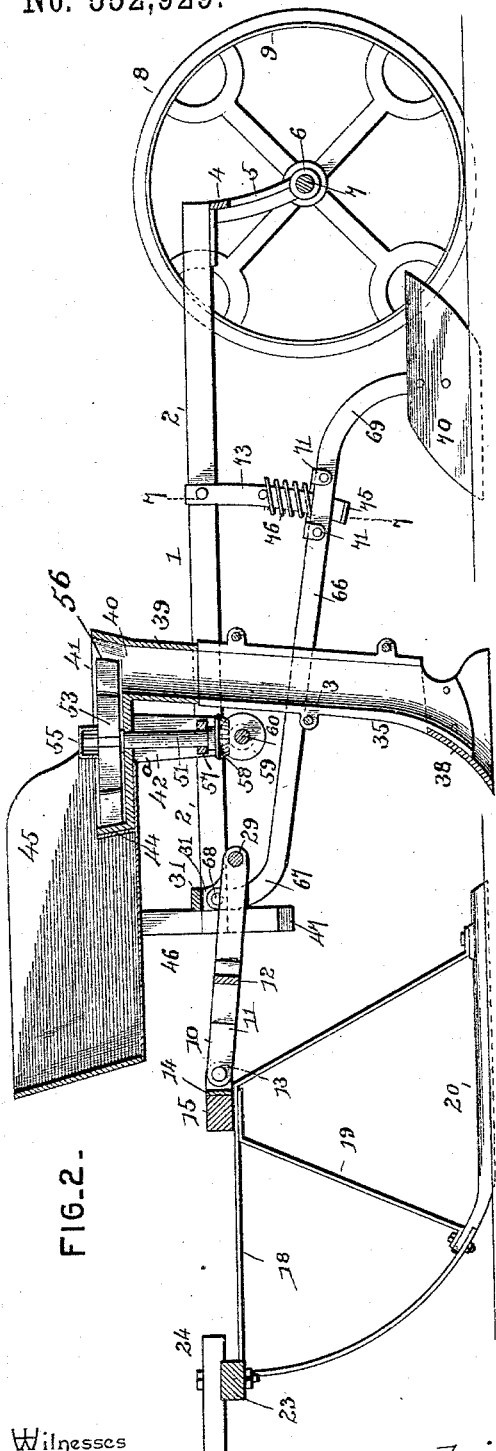
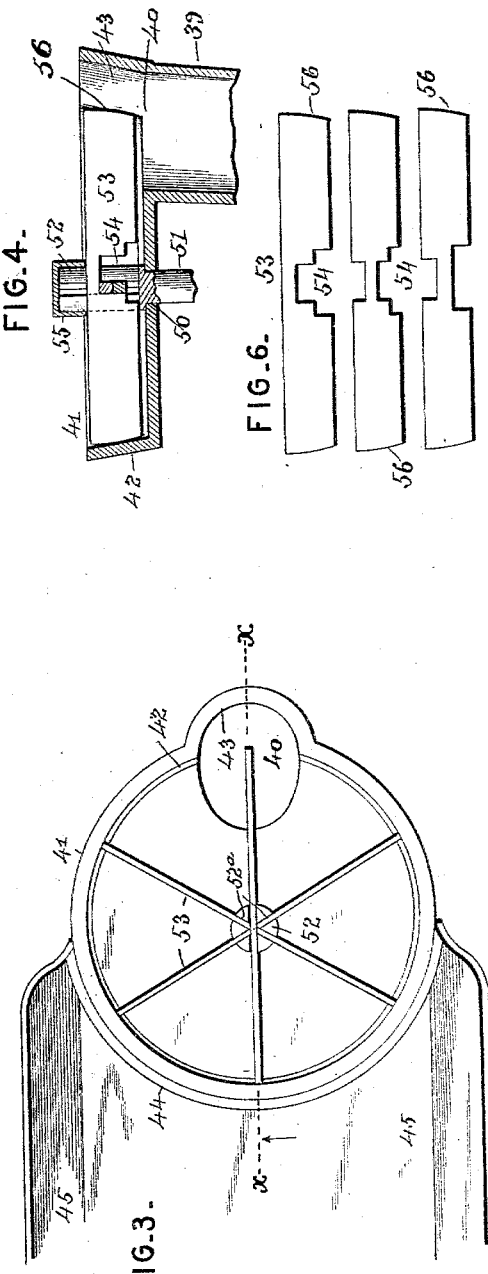
Witnesses
Jas. K. McCathran
D. P. Wehaupter
Inventor
George C. Sherman
By his Attorneys.
C. A. Snow & Co.

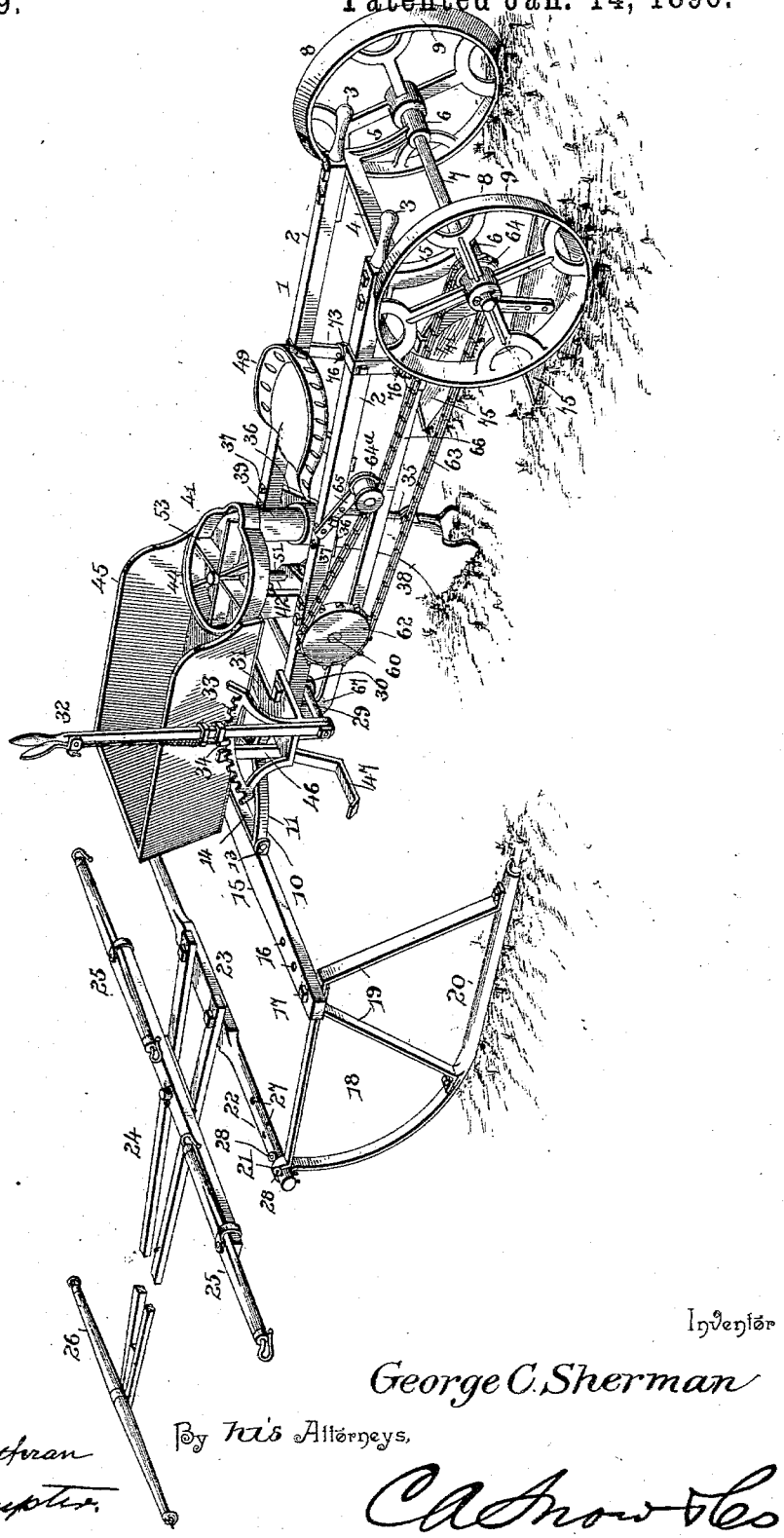

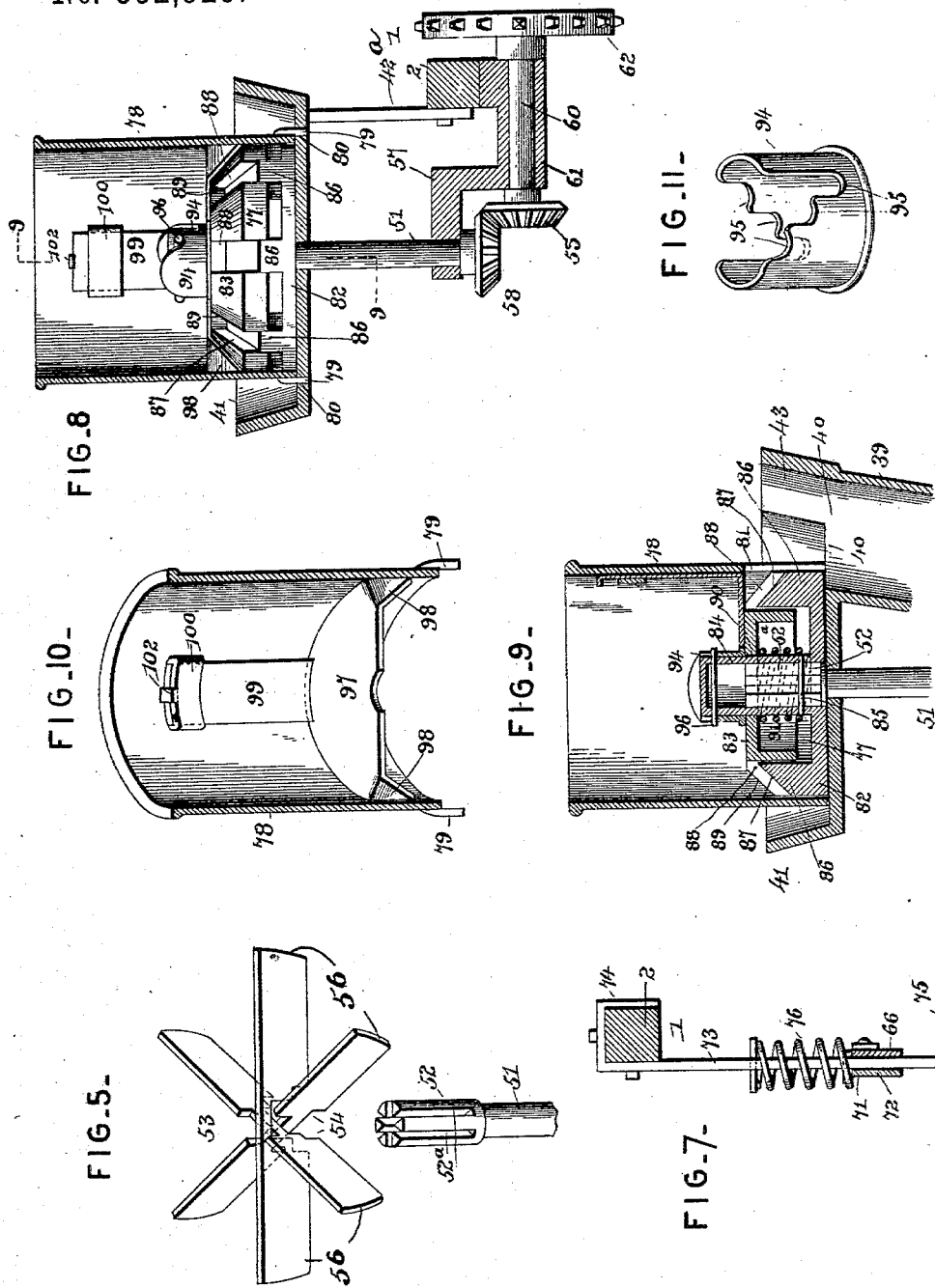

UNITED STATES PATENT OFFICE.

GEORGE C. SHERMAN, OF ALFRED, NEW YORK, ASSIGNOR TO LORIN L. GRIDLEY, OF SAME PLACE.

POTATO-PLANTER.

SPECIFICATION forming part of Letters Patent No. 552,929, dated January 14, 1896.

Application filed October 30, 1894. Serial No. 527,476. (No model.)

*To all whom it may concern:*

Be it known that I, GEORGE C. SHERMAN, a citizen of the United States, residing at Alfred, in the county of Allegany and State of New York, have invented a new and useful Potato-Planter, of which the following is a specification.

This invention relates to potato-planters; and it has for its object to provide a new and useful planting-machine of this character having simple and efficient means for positively and accurately planting potatoes at regularly-spaced intervals.

To this end the main and primary object of the invention contemplates a construction of machine that will insure the proper planting of potatoes, and will have every necessary adjustment to secure this result, while at the same time the invention also contemplates an attachment that will conveniently convert the machine for use as a corn-planter.

With these and other objects in view, which will readily appear as the nature of the invention is better understood, the same consists in the novel construction, combination and arrangement of parts hereinafter more fully described, illustrated and claimed.

In the drawings, Figure 1 is a perspective view of a potato-planting machine constructed in accordance with this invention. Fig. 2 is a central vertical longitudinal sectional view thereof. Fig. 3 is an enlarged detail plan view of one end of the machine, including the potato-dropping mechanism. Fig. 4 is an enlarged sectional view on the line *x x* of Fig. 3. Fig. 5 is a detail in perspective of the slitted shaft-hub and spider dropping-wheels disconnected. Fig. 6 is a detail elevation of the spoke-arms of the spider dropping-wheel. Fig. 7 is an enlarged detail sectional view on the line 7 7 of Fig. 2. Fig. 8 is a detail vertical sectional view showing the corn-planting attachment substituted for the potato-planting mechanism. Fig. 9 is a detail sectional view on the line 9 9 of Fig. 8. Fig. 10 is a detail in perspective, partly in section, of the seed-box of the corn-planting attachment. Fig. 11 is a detail in perspective of the loose adjusting-collar for the corn-dropping wheel.

Referring to the accompanying drawings, 1 designates a substantially rectangular planter-frame essentially comprising the parallel connected side bars 2, terminating at their rear ends in the handles 3, that provide for guiding the machine accurately over the field being planted, and said rectangular planter-frame 1 has connected to the rear end thereof a rear bearing-frame 4, that is provided with the opposite depending bearing-arms 5, terminating at their lower ends in collars 6, in which is journaled transversely the rear revolving axle 7, on opposite ends of which are mounted the ground-wheels 8. The said ground-wheels 8 are provided with inner beveled peripheries forming sharp peripheral flanges 9 at the outer side edges of the wheel, which flanges serve to secure a firm purchase in the ground and prevent the rear end of the machine from slipping or sliding when being operated on a side hill. The ground-wheels 8, and the rear axle on which they are mounted, form the rear support for the planter-frame 1, and at its front end the said planter-frame 1 has connected therewith the adjustable reach-frame 10.

The adjustable reach-frame 10 essentially comprises oppositely compoundly curved frame-bars 11, connected together by an intermediate web 12, and the outer ends of said frame-bars 12 are pivotally connected to the opposite pivot-ears 13 at opposite extremities of a pivot-plate 14, attached to the rear side of a transverse supporting-bar 15, that is provided in its opposite ends with a series of bolt openings or holes 16, that are adapted to receive the fastening-bolts 17, connected to the upper sides of the runner-frames 18. The runner-frames 18 consist of a connected series of angularly-arranged frame-strips 19, that are preferably made of sheet metal, and attached to the said runner-frames are the longitudinally-disposed runner-shoes 20. The runner-shoes 20 are of an inverted-U shape in cross-section, and the opposite side edges thereof have a similar purchase in the ground to the flanges 9 of the wheels 8 in order to prevent any slipping or sliding of the front end of the machine, while at the same time the shape of said runner-shoes gives the same the function of acting as markers to mark the rows to be planted, and with this construction of runner-shoe it is simply necessary that the runner next to the planted part of the field follow back in the mark made by the outside runner in order to accomplish the even and regular planting of the field.

The series of bolt openings or holes 16 in the ends of the transverse supporting-bar 15 admit of an adjustment of the opposite runner-frames to and from each other according to the desired width between the rows being planted, and at their front upper corners the said runner-frames 18 are provided with the integral bearing-eyes 21, that loosely receive the opposite rounded ends 22 of the transverse draft-bar 23, to which is attached the inner end of the draft-tongue 24, carrying the usual whiffletree 25 and neck-yoke 26. The rounded ends 22 of the draft-bar 23 are provided with a series of key-openings 27 to removably receive the keys or pins 28, that engage in said openings at both sides of the bearing-eyes 21 of the runner-frames, and the series of openings in the ends of said draft-bar admit of a connection of the runner-frames thereto corresponding to their connection with the transverse supporting-bar. The transverse draft-bar has a perfectly-free turning movement in the bearing-eyes of the running-frames, and this connection, combined with the pivotal connection of the supporting-bar 15 with the adjustable reach-frame 10, admits of a self-adjustment for the runner-frames in traveling over stony or uneven ground, thereby providing a machine capable of use on all kinds of ground.

The adjustable reach-frame 10 is made fast at its inner rear end on a transverse rock-shaft 29 journaled in the depending bearing-lugs 30, projected from opposite ends of a transverse bearing-plate 31, that connects the parallel side bars 2 of the frame 1, at the front ends thereof. The said rock-shaft 29 is arranged to work under the front end of the frame 1, and has attached to one end thereof at one side of the frame 1 the lower end of an adjusting-lever 32, that works at one side of a stationary notched catch-segment 33, projected upwardly from one end of the front bearing-plate 31. The said adjusting-lever 32 has mounted thereon a hand-controlled catch-dog 34, adapted to engage in the notches of said segment to provide for holding the said lever stationary in any adjusted position. With the runners on the ground it is simply necessary to move the adjusting-lever 32 in either direction to provide for adjusting or swinging the adjustable reach-frame 10, and thereby raising and lowering the front end of the planter-frame 1 to adjust the depth at which the drill tube or spout 35 shall run in the ground.

The drill tube or spout 35 is arranged to work under the planter-frame at a point near the front end thereof, and said drill tube or spout is provided near its upper end with diametrically-opposite offstanding attaching-flanges 36, that are fastened by the bolts 37 to opposite under sides of the frame 1, near the front end thereof, and at its lower end the said tube or spout 35 is provided with a removable V-shaped digging-shoe 38, that serves to open up the furrow for the reception of the potatoes or other seeds planted by the machine, and the depth at which the shoe 38 travels in the ground is regulated by adjusting the lever 32, in the manner already described. The drill tube or spout 35 is adapted to have arranged in alignment with the upper open end thereof a short depending delivering-spout 39, that serves to deliver the potatoes or other seed into the drill tube or spout 35, and said short delivering-spout 39 communicates at its upper end with the dropping-opening 40, formed in the bottom of a circular hopper-pan 41, and at one side of the center thereof. The spout 39 is preferably formed integral with pan 41, as illustrated.

The circular hopper-pan 41 is supported above the frame 1, near the front end thereof, by means of a pair of depending bracket-arms 42ª, projected from the bottom of said pan at diametrically-opposite points, and attached at their lower ends to opposite inner sides of the said frame 1. The said circular hopper-pan 41 is encircled at its edge by a slightly flared or beveled rim or flange 42, that is provided with an offset portion 43, at one side of the dropping-opening 40, in order to allow the potatoes to freely pass into the spout 39. The said pan is fitted at one side within the curved seat 44, at the open end of a side-inclosed hopper-box 45, that is supported over the front end of the frame 1 on the upper ends of the opposite supporting-arms 46, that are attached intermediate of their ends to the front ends of the side bars 2, and are angled at their lower ends into the offstanding footrests or steps 47, and at a point adjacent to the circular hopper-pan 41 an operator's seat 49 is arranged on top of the frame 1, so that a boy or other operator sitting thereon can easily reach the potatoes in the side-inclosed hopper-box 45, to provide for feeding the same one at a time into the said circular hopper-pan.

The circular hopper-pan 41 is provided in the bottom thereof with an eccentrically-disposed bearing-opening 50, in which works the upper end of a vertical shaft 51, and said vertical shaft 51 carries at its upper end a cylindrical hub 52. The cylindrical hub 52 projects above the bottom of the pan 41, and is provided with a series of vertically-disposed intersecting-slits 52ª that are open at their upper ends to removably receive therein a radial series of spoke-arms 53, that together complete a spider dropping-wheel for delivering the potatoes to the dropping-opening 40 of said pan. The spoke-arms 53 are provided intermediate of their ends with the elongated notched portions 54, receiving the intersecting portions of the other crossing spoke-arms, so that all of said spoke-arms can lie in the same plane within the pan 41 in which they rotate, while at the same time admitting of a longitudinal sliding movement for each spoke-arm independent of the others. The said spoke-arms 53 are removably retained within the slits of the hub 52 by means of a hub-cap 55 removably fitted onto the upper end of said hub above the spoke-arms, which latter are provided with slightly rounded or beveled extremities 56 that have a sliding registering-contact with the slightly flared or beveled rim 42 of the circular hopper-pan.

As the vertical shaft 51 rotates it will be obvious that by reason of the eccentric disposition of the hub 52, the projection of said spoke-arms from the side of the hub next to the dropping-opening will be greater than from the side next to the hopper-box 45, and the continued rotation of the shaft carries the ends of the spoke-arms around in contact with the rim or flange of the hopper-pan, and the said spoke-arms therefore slide back and forth through the slits in the hub. By reason of providing this arrangement and operation of the spoke-arms of the spider dropping-wheel, it will be obvious that the short ends of said arms will travel slower than the long ends working over the dropping-openings, thereby allowing the person who feeds the potatoes in between the spoke-arms to easily keep up with the rotation of the spider dropping-wheel.

The vertical shaft 51 turns at its lower end in a bearing plate or arm 57, projected from the inner side of one of the bracket-arms 42, and upon its lower extremity the said vertical shaft has mounted a horizontal beveled gear-wheel 58 meshing with a similar vertically-disposed beveled gear-wheel 59, that is mounted on the inner end of a horizontal countershaft 60, journaled in a suitable bearing 61 under one side of the frame 1, and carrying upon its outer end a sprocket-wheel 62 over which passes a drive-chain 63. The drive-chain 63 also passes over a drive sprocket-wheel 64 mounted on the rear wheel-axle 7 at one side of one of the wheels 8, which thereby serves to communicate motion to the dropping mechanism described. Adjacent to the sprocket-wheel 62 is arranged a flanged idler-pulley 64ª, journaled on the lower end of an adjustable supporting-arm 65, fitted to one side of the frame 1, and said idler-pulley bears on the upper portion of the drive-chain 63, and serves to maintain the same at a proper tension.

Arranged at both sides of the drill tube or spout 35 are the self-adjusting shovel-beams 66. The self-adjusting shovel-beams 66 are provided with upwardly-curved front ends 67, that are pivotally secured, as at 68, to the inner sides of the frame 1 at the front end thereof, and by reason of this connection of said shovel-beams to the frame, side wabbling of the same is prevented. The said shovel-beams 66 are provided with rear downwardly-curved attaching-feet 69, to the inner sides and at the lower extremities of which are fastened diamond-shaped covering-shovels 70, that serve to cover up the furrow into which the potatoes have been dropped through the drill tube or spout 35. One of the said shovel-beams 66 is longer than the other, so that the said oppositely-disposed shovels 70 are arranged one in advance of the other, while both of the same are located some distance in rear of the drill tube or spout, and this arrangement of the covering-shovels allows stones, sod, and the like to work free of the soil before the same is completely turned back into the furrow.

The pivotally-supported and self-adjusting shovel-beams 66 have detachably fitted thereon near their rear ends the clip-plates 71, that are provided with intermediate loop portions 72 to receive the stationary guide-bars 73. The stationary guide-bars 73 are slightly curved and are secured at their upper U-shaped ends 74 onto the side bars 2 of the frame 1, and said guide-bars are provided at their lower ends with stop-flanges 75 to limit the downward adjustment of the beams 66. Coiled springs 76 are arranged on the stationary guide-bars 73 over the beams 66, and serve to hold the covering-shovels 70 firmly down onto the ground to insure a covering up of the furrow, as will be readily understood.

In order to convert the herein-described machine into a corn-planter, the hub-cap 55 is removed in order to allow the spoke-arms 53 of the spider dropping-wheel to be slipped out of the cylindrical hub 52, and in place of the spider dropping-wheel a seed-dropping wheel 77 is substituted, which seed-dropping wheel is arranged to work within the lower end of a removable cylindrical seed-box 78. The removable cylindrical seed-box 78 is provided at diametrically-opposite points and at its lower ends with depending pins 79, adapted to fit in the pin-openings 80, formed in the bottom of the hopper-pan 41, and at the side next to the dropping-opening 40 the said cylindrical seed-box is provided with a seed-opening 81, communicating with said dropping-opening. The said dropping-wheel 77 consists of the duplicate superposed disks 82 and 83, respectively, the lower disk 82 being provided with a central upwardly-projecting tubular spindle 84, inside of which is arranged a transverse connecting-pin 85, that is adapted to be slipped into engagement with one of the slits 52ª of the cylindrical hub 52, that projects up into the tubular spindle 84 when the dropping-wheel 77 is fitted onto the hub 52, thereby providing a connection with said hub so that rotation will be imparted to the dropping-wheel within the seed-box.

The disk 82 of the dropping-wheel is further provided at its periphery with a circular series of upwardly-projecting lugs 86, having upper beveled ends 87 and adapted to register within the peripheral seed-notches 88, formed in the beveled edge 89 of the uppermost disk 83, that is provided with a central opening 90, to loosely fit over the tubular spindle 84 of the lower disk 82. A spring 91 is arranged on the spindle 84 between the two disks 82 and 83 to hold the same normally separated, and arranged on said spindle 84 above the upper disk 83 is a loose adjusting-collar 94. The loose adjusting-collar 94 is provided in diametrically opposite sides with a series of catch-notches 95 of different depths, and adapted to engage over the projecting ends of a catch-pin or stud 96, fitted in the upper end of the tubular spindle 84. By adjusting the collar 94 to engage the notches thereof with the pin or stud 96 it will be obvious that the space between the two disks 82 and 83 may be adjusted to regulate the depth of the seed-notches 88 according to the quantity of seed that it is desired to plant.

The dropping-wheel 77 is arranged to work within the bottom of the seed-box 78, beneath a segmental self-adjusting partition-plate 97, that is provided with bent extremities 98 that register with the beveled edge 89 of the upper wheel-disk 83, in order to cut off the superfluous seed within the seed-notches 88 before the seed is carried around to the seed-opening 81 and allowed to run off of the upper beveled ends 87 of the lugs 86 that form the bottoms for the peripheral seed-notches 88. The segmental partition-plate 97 accommodates itself to the adjustment of the dropping-wheel 77 and rests loosely on top thereof, and said partition-plate is provided at one edge with an upwardly-extending slide-arm 99 that works in a guide-loop 100, arranged on the inner side of the seed-box 78, and the downward adjustment of said partition-plate is limited by means of a stop projection 102, formed on the upper end of the slide-arm 99.

The many advantages of the herein-described combination planting-machine will be readily apparent to those skilled in the art, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a planter, the combination of a planter frame, a wheeled axle supporting the rear end of said frame, a front runner frame, a forwardly extending adjustable reach frame connecting the front end of the planter frame with said runner frame, and an adjusting lever suitably connected with said reach frame to adjust the same and thereby raise or lower the front end of the planter frame, substantially as set forth.

2. In a planter, the combination of the planter frame, a wheeled axle arranged at the rear end of said frame, a runner frame carrying runners having edges to form a planting mark on the ground, and a lever adjusted connection between said runner frame and the front end of the planter frame, substantially as set forth.

3. In a planter, the combination of the planter frame, having handles at its rear end, a depending rear bearing frame attached to the rear end of the planter frame, a wheeled axle mounted in said depending bearing frame, an adjustable combined runner and draft frame, and an adjustable connection between the front end of the planter frame and said combined runner and draft frame, substantially as set forth.

4. In a planter, the planter frame carrying a wheeled axle at its rear end, a pair of connected runners having inverted U-shaped shoes, the opposite edges of which act in the capacity of markers and an adjustable connection between the connected runners and the front end of the planter frame, substantially as set forth.

5. In a planter, the combination of the planter frame carrying a wheeled axle at its rear end, a pair of opposite runner frames carrying marking runner shoes of an inverted U-shape in cross section, said runner frames being provided at their front upper corners with integral bearing eyes, a transverse supporting bar adjustably connected at its opposite ends to the upper sides of said runner frames, an adjustable connection between the front end of the planter frame and said transverse supporting bar, a transverse draft bar having opposite rounded ends adjustably fitted in the bearing eyes of said runner frames, and the draft tongue attached to said draft bar, substantially as set forth.

6. In a planter, the combination of the planter frame carrying a wheeled axle at its rear end, a pair of opposite runner frames carrying inverted U-shaped marking shoes, a transverse supporting bar adjustably connecting said opposite runner frames, a rock shaft journaled transversely under the front end of said planter frame, an adjustable reach frame made fast at one end on said rock shaft and pivotally connected at its opposite front end to said transverse supporting bar, an adjusting lever attached to one end of said rock shaft, a catch device for said adjusting lever, and planting mechanism arranged on the planter frame, substantially as set forth.

7. In a planter, the combination of the planter frame carrying a drill tube or spout, an open hopper pan supported on the frame above the drill tube or spout and provided with a depending delivery spout communicating with the drill tube or spout, a vertically arranged shaft projecting through the bottom of said pan and provided at its upper end above the bottom of the pan with a hub having a series of vertically disposed slits that are open at their upper ends, a dropping wheel rotated by said shaft and having a part that removably and transversely fits in the slits of said hub, and means for rotating said shaft, substantially as set forth.

8. In a planter, the combination of the planter frame carrying a fixed drill tube or spout and a hopper box, a circular open hopper pan supported above said drill tube or spout and provided at one side of its center with a dropping opening and with an upwardly disposed peripheral rim, a vertically arranged shaft projecting eccentrically through the bottom of said pan, a self-adjusting dropping wheel removably mounted on the upper end of the shaft and having movable arms, the ends of which have a sliding registering contact with the upwardly disposed rim of the pan, and means for rotating said shaft, substantially as set forth.

9. In a planter, the combination of a planter frame carrying a drill tube or spout, a side inclosed hopper box supported over the front end of said frame, a circular open hopper pan arranged partly within the open end of said hopper box, a spider dropping wheel mounted to revolve within said pan, a vertically arranged shaft connected with said spider dropping wheel and carrying at its lower end a beveled gear wheel, a suitably arranged counter shaft carrying at its inner end a beveled gear wheel meshing with that of the vertically arranged shaft and carrying at its outer end a sprocket wheel, the wheeled axle for the planter frame carrying a drive sprocket wheel, a drive chain arranged over said sprocket wheels, an operator's seat arranged on the frame adjacent to said open hopper pan, substantially as set forth.

10. In a planter, the combination of the planter frame carrying a fixed drill tube or spout and a hopper box, a circular open hopper pan supported above said frame and provided at one side of its center with a dropping opening with an eccentrically disposed bearing opening and with a slightly flared and beveled upwardly disposed rim, a vertically arranged shaft working in said eccentrically disposed bearing opening and provided at its upper end with a hub having a series of vertically disposed intersecting slits, a spider dropping wheel working within said pan and consisting of a radial series of independently movable spoke arms provided intermediate of their ends with elongated notched portions registering together within the slits of said hub, said spoke arms also having rounded or beveled extremities adapted to have a sliding registering contact with said rim, a hub cap removably fitted on said hub above the spoke arms, and means for rotating said vertically arranged shaft, substantially as set forth.

11. In a planter, the combination of the planter frame carrying a fixed drill tube or spout, dropping mechanism arranged above said tube or spout, opposite self-adjusting shovel beams provided with front upwardly curved ends pivotally connected to the front end of the planter frame and with rear downwardly curved attaching feet carrying reversely disposed diamond shaped covering shovels arranged one in advance of the other, stationary curved guide bars attached to opposite sides of the frame and provided with lower flanged ends to limit the downward adjustment of the beams, clip plates detachably fitted on said beams and provided with intermediate loop portions receiving said stationary guide bars, and coiled springs arranged on the guide bars above the beams, substantially as set forth.

In testimony that I claim the foregoing as my own I have hereto affixed my signature in the presence of two witnesses.

GEORGE C. SHERMAN.

Witnesses:
L. K. BURDICK,
E. E. HAMILTON.